United States Patent [19]

Forsythe

[11] 4,197,343
[45] Apr. 8, 1980

[54] NEEDLE-PUNCHED LAMINATE

[75] Inventor: George Forsythe, Andover, Mass.

[73] Assignee: Foss Manufacturing Co., Inc., Haverhill, Mass.

[21] Appl. No.: 930,151

[22] Filed: Aug. 2, 1978

[51] Int. Cl.² ............................................. B32B 7/00
[52] U.S. Cl. .................................... 428/195; 28/109; 428/234; 428/246; 428/253; 428/284; 428/300; 428/310
[58] Field of Search .................. 156/148; 28/109, 112; 428/284, 300, 301, 310, 317, 234, 246, 253, 195

[56] References Cited

U.S. PATENT DOCUMENTS

| | | | |
|---|---|---|---|
| 3,352,739 | 11/1967 | Blue | 156/148 |
| 3,400,188 | 9/1968 | Olson | 156/148 |
| 3,476,626 | 11/1969 | Charlton et al. | 156/148 |
| 3,506,529 | 4/1970 | Sanders | 156/148 |
| 3,532,588 | 10/1970 | Newman | 156/148 |
| 3,674,618 | 7/1972 | Spann | 156/148 |
| 3,684,601 | 8/1972 | Hayward | 156/148 |
| 3,686,047 | 8/1976 | Crowley | 156/148 |
| 3,849,223 | 11/1974 | Kent | 28/109 |

*Primary Examiner*—James J. Bell
*Attorney, Agent, or Firm*—Jerry Cohen

[57] ABSTRACT

A synthetic furniture or automobile upholstery or wallcovering or the like, is provided using vinyl or similar film as a leather substitute and backing it with a nonwoven fabric layer (or layers) which is needle-punched through the film in limited stripe areas of the film to produce a variety of straight, well-defined, uniform stripes of fiber and/or vinyl running parallel to the longitudinal (feed) direction of a film web with distinct stripe edges and good control thereof and further characterized by eliminating sag or loosening in the non-needle-punched areas by provision of a filler foam or a lively fiber material as part of the non-woven fiber, the essential lateral cross section thickness regularity of the product being maintained by compression of such filler in the needle-punched area.

4 Claims, 5 Drawing Figures

NEEDLE-PUNCHED LAMINATE

BACKGROUND OF THE INVENTION

The present invention relates to synthetic upholstery composites and is particularly characterized by a striking appearance economically and reliably obtained.

Luxuriant pile type upholstery can be obtained from natural skins of wool or hair bearing animals or through complicated synthetic arrangement.

It is an important object of the invention to provide a laminate economically attaining the same end.

It is a further object of the invention to provide patterning, and more particularly striping of raised pile or hair-like areas against the background or bare leather-like areas for striking contrast consistent with the preceding object.

It is a further object of the invention to attain controllable thickness consistent with one or more of the preceding objects.

It is a further object of the invention to produce a breathable laminate with properties similar to those of natural skins and hides of wool and hair bearing animals consistent with one or more of the preceding objects.

It is a further object of the invention to avoid processing pitfalls or too frequent equipment maintenance needs consistent with one or more of the preceding objects.

SUMMARY OF THE INVENTION

In accordance with the present invention, a vinyl film or other tough film of 5-20 mils, preferably 10-13 mils, in a wide web roll form is laminated with non-woven fiber layer backing, essentially without use of adhesives, by needle-punching the non-woven layer backing through the film in limited pattern areas, preferably longitudinal stripes (longitudinal being taken as parallel to the long direction of the film web). The non-woven fiber web and film web are substantially the same width and the composite so produced is characterized by firmly bonding the two layers together. The patterning is selected so that there is no excessive space between needle-punched areas, such spacing being limited to no more than five times the width of the adjacent needle-punched stripe area (as taken in a lateral cross section). The needle-punched areas have some tendency to sag and separate (there being no adhesive between them) and this is counteracted by provision of a filler in accordance with the invention. The filler may be inherently provided by the non-woven fiber layer through use of a very lively fiber therein such as nylon or similar synthetics or by insertion of a foam layer which runs the full width of the non-woven and film layers. It has been found that the needle-punched areas are characterized by a compression and pulling in of the filler in the needle-punched areas so that an overall thickness regularity is maintained without excessive bulging out in the needle-punched areas.

According to a further aspect of the invention, multiple non-woven fiber layers of different colors can be provided with the unexpected result of startling color contrasts obtained in the punched through fibers.

According to a still further aspect of the invention, regular and repeating alignments of needle are used, allowing for "repeats" in contrast to conventional needle-punching practice which seeks to avoid such repeats. It is also desirable to stagger the angles of attack of different needles presented to the advancing webs as they punch through. Extra long guides are provided for the needles in a bottom plate structure and these are found to be advantageous to consistently maintain the degree of needle-punched bonding with consistent appearance of the stripes and good edge definition as well as homogenous character throughout the body of each stripe of needle-punched fibers on the film front face.

The fibers are characterized by good body at the front face and permanence in contrast to such prior art contemplated alternatives as deposited adhesively bonded fibers (e.g., deposited by flocking or the like). As mentioned above, the present invention affords control of color. It also affords control of fiber loft in the stripes adjusted simply through adjustment of depth of penetration of the needles.

Other objects, features and advantages of the invention, together with the above, will be apparent from the following detailed description of preferred embodiments taken in connection with the accompanying drawing, in which,

DETAILED DESCRIPTION OF PREFERRED EMBODIMENTS

Figure 1:
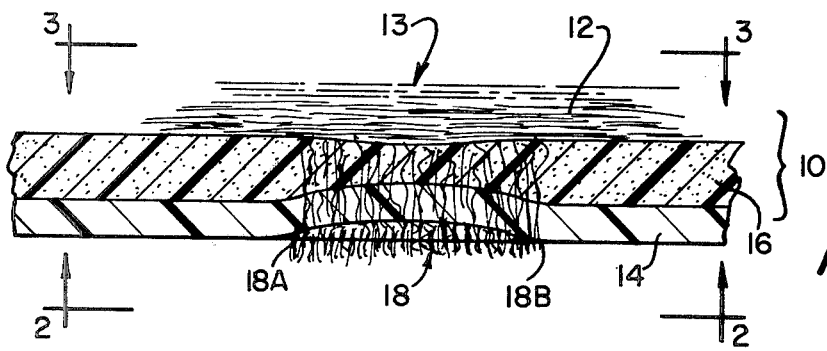
FIG. 1 is a cross section view of a laminate being made up in accordane with a preferred embodiment of the invention.
Figure 2:
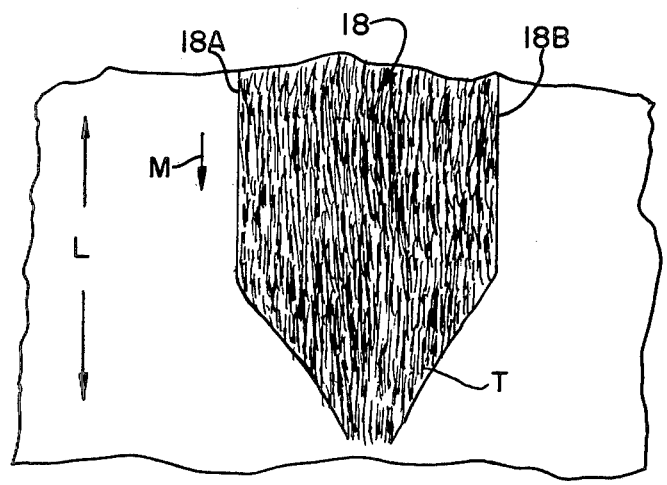
FIG. 2 is a partial bottom view of the laminate of FIG. 1 viewed as indicated by the arrows 2—2 in FIG. 1; at a portion of the web just beginning passage under the needle board.

FIG. 1 shows a laminate 10 comprising a non-woven fiber layer 12, a vinyl film layer14 and an intervening film foam layer 16. At 18, there is indicated a stripe of fibers needle punched through the foam and film with edges 18A and 18B. The bottom view of FIG. 2 shows the punched through stripe 18, edges 18A and 18B. Arrows L indicate the longitudinal dimension of the running web and arrow M indicates the direction of motion. A starting taper T is provided by gathering in the fiber layer to provide gradual loading of the needle punch apparatus.

Figure 3:
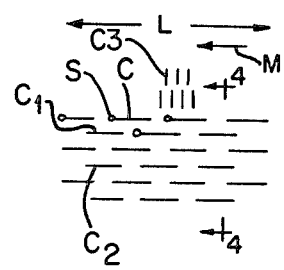
FIG. 3 is a top view of the needle board section which produces the laminate stripe of FIG. 1 and viewed as indicated by the arrows 3—3 of FIG. 1.

Referring to FIG. 3, the top view, an arrangement of needle cross section in the needle board of an otherwise conventional needle punching structure as shown by indicating the crank directions of the needles by the letter C. The hook H of the needle generally has a definite relationship to the crank. The arrows L and M in FIG. 3 have the same meaning and are consistent with such references in FIG. 2 taking into account that FIG. 3 is a top view of a given needleboard area and FIG. 2 is a bottom view of the laminate under it showing needled-througbh fiber ends. In the finished product, the stripe or stripes produced by the present invention will be placed toward the user who will see the FIG. 2 side (in a completed form) but not the tapered portion.

Figure 4A:
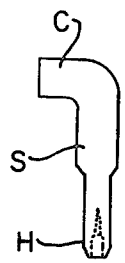
FIG 4A is a side view of the FIG. 4 needle.
Figure 4:
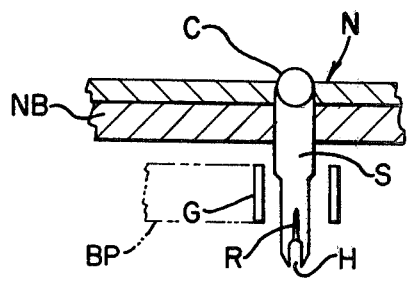
FIG. 4 is a cross section of a portion of a needle array used as part of the array indicated in FIG. 3 with a view being taken as indicated by arrows 4—4 in FIG. 3.

Referring now to FIGS. 4-4A, a typical needle end is shown having a crank C as mentioned above and being contained in a needle board B. Each such needle has a shaft S and a U-form hook section H with side reliefs R. Elongated side guides G are provided and typically in a length of one inch plus or minus a quarter inch, i.e., about four times the usual length of such guides. The needle board is about ¾ inch thick and the needle has a length of about 2½ inches.

Referring back to FIG. 3, it will be noted that the needles are aligned as indicated, for instance, at C-1 and C-2 to permit repeats in contrast to conventional practice which is to avoid such repeats to the maximum extent practical.

Referring back to FIG. 1, there is also shown a phantom layer 13 which can comprises one or more supplementary, different color, non-woven fiber layers (in contrast to the color or fiber layer 12). In needle punching through from above, it has been found surprisingly that blends are not achieved. Instead, the color is highly dependent on layering. The color of 13 will stand out in sharp contrast to and as a minority phase compared to a surrounding matrix of the color of fibers of layer 12.

A particularly important aspect of the invention is that thickness is controlled through the compression of fill by the locking of punched through fibers in stripe 18 which there is a greater thickness of the laminate at 18 depending on a depth of punched through of the fibers that change of thickness is solely dependent on the fibers and as a user leans against fibers 18, they yield so that the intrinsic thickness of the laminate is substantially constant in lateral cross sections. The foam layer 16 filling in between layers 12 and 14 provides fill in the non striped areas to avoid regions of separation. Such separation can also be avoided if the vinyl is held taut in its end use. The product as a whole has a desirable body and hand because of the use of filler in this fashion, together with the appearance and hand effects of the vinyl/punched through fiber combination. It is desirable to preadhere the foam to the vinyl before running them together with the non-woven fiber layer. However, the use of adhesive should be minimized to avoid clogging the needles. It is preferred to form the foam in situ on the vinyl surface relying on the foam itself to constitute the adhesive bond to the film. Suitable choices for the non-woven fiber: polyester, nylon, rayon, acrylic, polyropylene, etc. Suitable choices for weights could be: 6, 7, 8, 10, 12, 14, 16 oz/yd.² Suitable staple lenghts: 2-8 inches.

A large number of vinyl films of 10-15 mil thickness, with and without attached foam (about ¼ inch thick when used) will utilized with variety of fibers of viscose and polyester fibers. Blends were also utilized. Polypropylene fibers were also used. The viscose fibers are typically 15 denier, 8 oz. per sq. yds., 0.95 inch gauge and of 0.113 gm/cc density and used in stripes of 3 inches. Polypropylene layers were 20 denier 13 oz/sq. yd. density, 0.325 inch gauge and 0.054 gm/cc and produced in 3 inch and 6 inch stripes. The polyester fiber layers were typically 16 denier, 13½ oz/sq. yd., 0.165 inch gauge and 0.110 gm/cc density and produced in 3 inch and 4 inch stripes. The vinyl films ranged from 10-15 mils. Fusible lace was used as an alternative to foam as a filler. In some of the tests, multiple fiber layers were placed behind the vinyl and punched through it. Where these fibers were of contrasting colors, the color of the back-most fiber layer would stand out in a matrix in punched through fibers of the more forward layer as described above in connection with items 12 and 13 of FIG. 1.

Tests show that cotton backing, or any other type of fibrous backing is undesirable on the vinyl layer. The needles tend to pick up the backing and push it through with the fiber mass leaving shreds of fiber exposed. This is particularly noticeable when the backing is a contrasting color to the fiber layer. In addition, any backing on the vinyl will impose a heavier demand on the needles and loom. A variety of support vinyls have been used including various colors, gauges, patterns grians or embossments. Criterial for the vinyl are that it be pliable, strong and tough enough to withstand the needle tufting action without needle breakage and/or require unusual loom capabilities to produce an acceptable product. Other films than vinyls of roughly similar strength and toughness can be used.

The fill may be any material which may be successfully needled and will capture and retain space. Polyethylene foam works well as a light-weight "space occupier". Foam meets all requirements including loft. Other usable fillers, including coarse, high denier, high loft lightly needled non-woven fabric layer sandwiched between the fiber laminate and the vinyl to act as a filler, or high loft or loose knit fabrics.

Needles used in the above experimental trials had a slot or hook at the opposite end of the needle from the crank as shown in the drawing. There is another needle which has a different configuration than the mentioned slot or hook needles. This fork needle has one long projecting point with a single hook located on the inside edge. In operation, the long point of the needle in its downward path first penetrates and opens the way for the hook section which has fibers in its grasp. Supposedly, the needle cuts down penetration, load but has deflection vulnerability and extra care mus be taken in its use.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Synthetic upholstery laminate product comprising a coherent, face film layer, backed by a non-woven fiber layer which is needle-punched through the film layer in longitudinal stripe areas thereof with intervening areas of the layers being unpunched, the fiber layer having two sub-layers, viz a back (outer) sub-layer and a forward (inner) sub-layer, the said sub-layers being of different colors, wherein an intervening filler is provided between the non-woven fiber and film layers, and wherein the needle punching compresses the fill so that the intrinsic lateral cross section thickness of the laminate is substantially constant and the backing, fill and film layers are securely held together in the punched and unpunched areas, and wherein multicolored fibers appear in the front of the needle-punch through areas with a distinct minor phase of one color in a matrix of a second color, the film being backed by a layer of the second color which in turn is backed by a layer of the first color.

2. The laminate product of claim 1 wherein the fill is a foam.

3. The laminate product of claim 1 wherein the fill is fibrous.

4. The laminate product of claim 1 wherein the fill is bonded to the film.

* * * * *